(12) United States Patent
Fein

(10) Patent No.: US 7,805,374 B2
(45) Date of Patent: Sep. 28, 2010

(54) DIGITAL MEDIA INVENTORY CONTROL, DISTRIBUTION AND DESTRUCTION SYSTEM

(76) Inventor: Gene Fein, 760 East St., Lenox, MA (US) 01240

( * ) Notice: Subject to any disclaimer, the term of this patent is extended or adjusted under 35 U.S.C. 154(b) by 1625 days.

(21) Appl. No.: 10/988,779

(22) Filed: Nov. 15, 2004

(65) Prior Publication Data

US 2005/0125355 A1 Jun. 9, 2005

Related U.S. Application Data

(60) Provisional application No. 60/523,239, filed on Nov. 19, 2003.

(51) Int. Cl.
*G06F 21/00* (2006.01)
(52) U.S. Cl. .......................... 705/57; 705/52
(58) Field of Classification Search ................ 705/57, 705/52
See application file for complete search history.

(56) References Cited

U.S. PATENT DOCUMENTS 5,909,638 A * 6/1999 Allen .......................... 725/146

| 2002/0156912 | A1* | 10/2002 | Hurst et al. ............... 709/236 |
| 2005/0102203 | A1* | 5/2005 | Keong ...................... 705/28 |
| 2008/0162367 | A1* | 7/2008 | Pitzer et al. ............... 705/76 |
| 2009/0204514 | A1* | 8/2009 | Bhogal et al. ............. 705/29 |
| 2009/0228908 | A1* | 9/2009 | Margis et al. ............. 725/6 |
| 2009/0302108 | A1* | 12/2009 | Patrick et al. ............. 235/385 |

* cited by examiner

*Primary Examiner*—Pierre E Elisca
(74) *Attorney, Agent, or Firm*—Stolowitz Ford Cowger LLP

(57) ABSTRACT

The system (10) includes a digital media creator-destroyer apparatus (12) for receiving and storing digital media from a remote digital media source (20), for generating multiple transferable copies of the digital media, and for destroying unused copies of the digital media. The digital media creator-destroyer apparatus (12) is housed within a retail store (14) or similar outlet that displays transferable copies of digital media to end-user purchasers. The system (10) provides retailer control at a single store (14) level, regional or national (38) level of inventory, distribution and destruction of digital media, such as music, movies, video games, computer software, ring tones for cell phones, etc., stored on compact disks, digital video disks or other apparatus capable of storing and transferring digital media. Destroying unused copies eliminates cost inefficiencies of the retailer having to return unused copies.

24 Claims, 3 Drawing Sheets

DIGITAL MEDIA INVENTORY CONTROL, DISTRIBUTION AND DESTRUCTION SYSTEM

CROSS REFERENCE TO RELATED APPLICATION

This Application claims the benefit of U.S. Provisional Patent Application Ser. No. 60/523,239 that was filed on Nov. 19, 2003, entitled "Digital Media Inventory Control, Distribution and Destruction System".

TECHNICAL FIELD

The present invention relates to a system for retail-based inventory control, distribution and destruction of digital media such as music, video games, movies, software, etc. that is capable of being stored in compact disks, digital video disks, memory components of computers, portable hand-held devices, etc.

BACKGROUND ART

It is well known that music, video games, movies, software, photographs, art work and any other information capable of being stored in a digital format (referred to herein as "digital media") may be stored in the form of compact disks, digital video discs, computer and portable memory components, etc. for commercial distribution. The vast majority of commercial distribution of such digital media is through traditional streams of commerce from owners or sources of the digital media through transportation to a plurality of retail stores where end-user purchasers survey a variety of digital media offerings at the retail stores prior to making a purchase decision to obtain a copy of the digital media.

Alternative and approximately parallel streams of commerce provide for catalogue shopping by end-users wherein an intermediate entity obtains and stores or "drop-ships" copies of digital media from the media source, and direct mails the copies to on-line or mail catalogue end-user purchasers. More modern methods of commercial distribution involve storage of digital media within shopping mall "kiosks" or within coffee house outlets for creation of copies of the media, such as by "burning" a compact disk containing the media, at a request of an end-user. For example, recently a distribution system known as "VMS" permits end-user purchasers within a retail store to scroll through a computer-based, menu-driven catalog for selection of a specific copy of digital media, and upon selection a compact disk burner within the retail store burns a copy of the selected digital media copy.

However, the conventional model of distribution from the media source to retail stores for physical display and comparative appreciation by end-users at modern shopping mall complexes remains the avenue for commercial distribution of the overwhelming majority of digital media copies. This is apparently because end-users enjoy the retail shopping experience involving an impact of visual advertising elements along with the social interchange common to selection and purchase of digital media copies amongst one's peers.

Unfortunately, all of the known systems for commercial distribution of copies of digital media suffer from major cost and security inefficiencies. For example, a manager or controller of a retail outlet must order a specific number of copies of a particular digital media (known as a "stock keeping unit" or "SKU") in anticipation of a release of such an SKU. At the same time, the retail store controller must order specific numbers of a wide variety of competing SKUs on a regular basis to replenish supplies, based upon inventory sales, etc. The particular numbers of various SKUs that must be ordered depends upon multiple factors, including the anticipated sales of the digital media, whether it is a popular music SKU, a movie, video game, software, etc., as well as upon the regional and national economic climate, the time of year with respect to gift purchasing factors, etc. Even the modern "kiosk", computer menu-driven selection systems fail to provide for any retailer control of inventory.

The inevitable result of so many uncertainties is that the retail store invariably ends up with many SKUs that simply cannot be sold, along with, in some cases, returned SKUs from end-users, as is well known. These unsold and returned SKUs must be returned to the media source or owner. That involves regular re-packaging of the unsold and returned SKUs and transport of the many copies of the digital media back to the media source, with the attendant time consuming problems of physical and monetary accounting for the unsold SKUs between the media source and the retail store. The accounting for and return of unsold SKUs presents significant security risks in potential theft of or accounting errors regarding the unsold and returned SKUs. Additionally, while the unsold SKU's are resident at the retail store, the store loses valuable storage space that could otherwise be productively utilized. The returned SKUs also pose significant cost challenges to the media source, that typically repackages the SKUs for distribution to higher sales retail outlets, or for discounted sales under different marketing efforts, etc.

It has been estimated that returning SKUs accounts for in excess of eighteen-percent of total costs for manufacture and distribution of digital media copies. Additionally, conventional systems for commercial distribution of digital media require frequent, time consuming, costly estimates of numbers of various SKUs of digital media to order and store in retail stores. Also, known catalogue and electronic distribution systems require similar sales controllers to make estimates of numbers of digital media SKUs for ordering, storage, and marketing to potential consumers. Moreover, none of the existing commercial distribution systems provide for meaningful security against unauthorized commercial copying of digital media.

Accordingly, there is a need for a digital media commercial distribution system that enables a retail store to control availability of digital media SKUs based primarily upon an in-store consumer-influenced demand, and that eliminates physical return of digital media copies by the retailer to the media source.

SUMMARY OF THE INVENTION

The invention is a digital media inventory control, distribution and destruction system. The system includes a digital media creator-destroyer apparatus for receiving and storing digital media from a remote digital media source, for generating multiple transferable copies of the digital media, and for destroying unused copies of the digital media. The digital media creator-destroyer apparatus would be housed within a retail store or similar outlet that displays digital media SKUs, or advertises their availability, to end-user purchasers.

A retail store manager or order controller would communicate directly through the creator-destroyer apparatus to a remote digital media source outside of the retail store, such as a musical compact disk distributor or third party supplier or a database containing media, to order specific digital media to be transferred electronically in digital format to the creator-destroyer apparatus to be stored in a memory of the creator-destroyer apparatus or called upon as a download as needed. The creator-destroyer apparatus would then generate a copy of the digital media SKU whenever an end-user elects to purchase a copy, or the apparatus could periodically generate multiple copies prior to anticipated sales, such as during each night-time between open retail hours, each weekend, or any desired time by the retailer, etc., based upon the anticipated needs of the retailer as determined by prior buying period sales, anticipated sales for new releases or catalogue, etc. The creator-destroyer apparatus also includes a mechanism for destroying unsold or returned copies of the digital media SKU. Consequently, the invention provides for consumer-influenced, in-store retailer control of generating digital media inventory; retailer control of distribution of copies of digital media SKUs; and also provides for the retailer controlling destruction of unsold and/or returned copies to eliminate any requirement for delivery of unsold or returned copies back to the source of the digital media.

For purposes of convenience herein, the "digital media inventory control, distribution and destruction system" invention will be abbreviated as "MICS" (for "media inventory control system"), and various components of the invention will be identified hereinafter with "MICS" as a prefix, such as a "MICS creator-destroyer apparatus".

In a preferred embodiment of the system of the invention, the MICS creator-destroyer apparatus also includes components for communicating to a MICS central database "storage information" that includes identification of digital media received by and stored within the MICS creator-destroyer, and "market information" on numbers of copies of digital media generated, copies of digital media transferred to purchasers, and copies of digital media destroyed by the MICS creator-destroyer. The MICS central database would be positioned in a location remote from the digital media creator-destroyer apparatus, and in an additional preferred embodiment would be in communication with a plurality of MICS creator-destroyer apparatus in a plurality of retail stores or similar locations accessible to end-users. Each MICS creator-destroyer apparatus may have local cached access to some or all of the database information.

In a further preferred embodiment, the MICS creator-destroyer apparatus would also generate in each of the multiple copies or SKU's of a specific stored digital media a distinct, linked-code specific to that copy or SKU of the digital media generated by the MICS creator-destroyer apparatus. Such unique linked-coding could also be recognized if the digital media copy containing the linked-code is mass manufactured at a traditional media manufacturing facility, so long as it contains individualized link-coding readable by the MICS creator-destroyer apparatus and which coding also is present for "matching" within the MICS central database. The linked-code identifies within each copy of the digital media an identification of the MICS creator-destroyer apparatus that generated the linked-code copy, or a mass manufacturer that created the unique linked-code copy, which may also include a date of generation of the linked-code copy. In an additional embodiment, the MICS creator-destroyer apparatus could also communicate the linked-code of a digital media copy to the MICS central database upon transfer of the copy to a purchaser, upon return of a purchased copy to the retailer, and upon destruction of the copy by the MICS creator-destroyer apparatus. The distinctive linked-code that identifies the MICS creator-destroyer apparatus that generated the digital media copy dramatically enhances security of the digital media by providing for precise, real-time tracking by the MICS central database of each copy of the digital media, and by aiding in identifying a source of unauthorized copying of the digital media from a linked-code copy.

In yet another embodiment, the MICS creator-destroyer apparatus may include a capacity for receiving and executing, from a remote order controller, such as a regional or national retail chain manager, that is not within the retail store, remote digital media acquisition information for generation or destruction of digital media copies. The remote digital media acquisition information or orders could also be for acquiring and storing digital media within the creator-destroyer apparatus from the remote digital media source.

The MICS creator-destroyer may also include components for transferring digital copies of the digital media to remote purchase apparatus that are not within the retail outlet. For example, the remote purchase apparatus may be at a "kiosk" or very small retail outlet wherein an end-user may select a specific digital media from a catalog within the remote purchase apparatus, and the apparatus would then burn and link-code a copy of the digital media onto a transportable memory, such as a compact disk. The remote purchase apparatus would then transfer market information on the transferred digital copy through the MICS creator-destroyer to the MICS central database.

In a further embodiment, the MICS creator-destroyer apparatus would have the capacity to receive and print advertising art associated with particular SKUs of selected digital media. For example, if the order controller for a retail store or a chain of retail stores located in a plurality of shopping malls orders transfer of a soon-to-be released recording of popular music digital media from the source of the digital media to the plurality of MICS creator-destroyer apparatus in the retail stores, the controller could also order transfer to the MICS creator-destroyer associated advertising artwork that would be printed out by the MICS creator destroyers with each generation of an SKU copy of the digital media. Retail store personnel could then insert the advertising artwork and related material into a protective packaging sleeve with the copy of the digital media at the time of purchase of the copy by the end user.

Alternatively, the advertising artwork may be inserted into empty packaging sleeves that are then placed on display for comparative appreciation by potential purchasers. The actual copy of the digital media would not be generated until the time of purchase, or is generated shortly therebefore by the MICS creator-destroyer and stored in a secure area, away from contact by the potential purchaser until it is placed in the packaging sleeve at the time of purchase and then transferred to the purchaser As is apparent, by isolating the actual copies of the digital media from contact by potential purchasers until the actual purchase transaction, the present invention provides for dramatically enhanced security against in-store theft or "shoplifting" of stored copies of digital media SKUs.

Accordingly, it is a general purpose of the present invention to provide a digital media inventory control, distribution and destruction system that overcomes deficiencies of the prior art.

It is a more specific purpose to provide a digital media inventory control, distribution and destruction system that provides for in-store, consumer-influenced, retail-driven control by a retail facility of generation and distribution of its digital media inventory and that eliminates costs associated with returns of unsold, returned or defective copies of digital media.

It is yet a further specific purpose to provide a digital media inventory control, distribution and destruction system that enhances security of the digital media against theft of copies and unauthorized copying of the digital media.

These and other purposes and advantages of the present digital media inventory control, distribution and destruction system will become more readily apparent when the following description is read in conjunction with the accompanying drawings.

DESCRIPTION OF THE PREFERRED EMBODIMENTS

Figure 1:
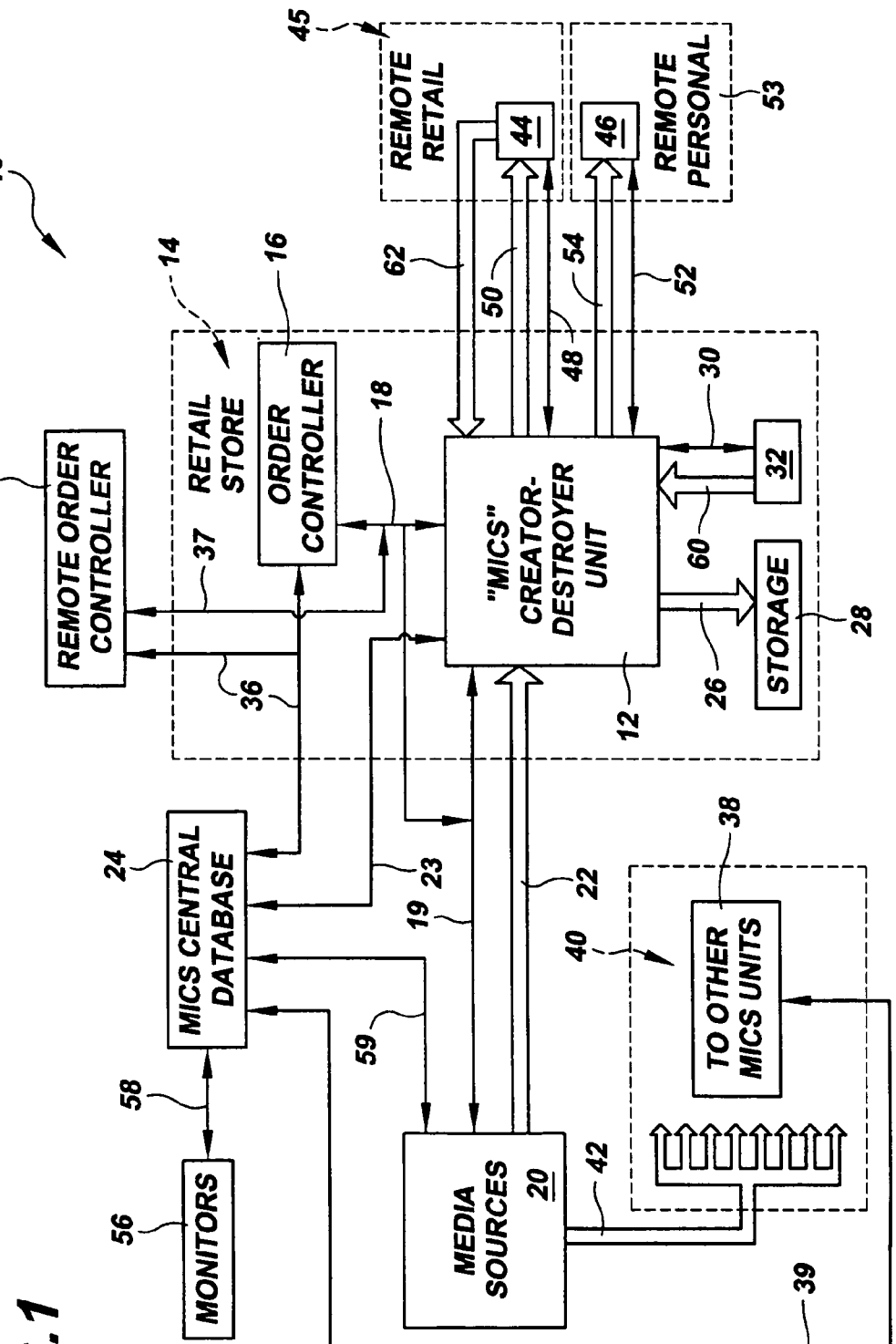
FIG. 1 is a simplified, schematic representation of a digital media inventory control, distribution and destruction system constructed in accordance with the present invention.

Referring to the drawings in detail, a digital media inventory control, distribution and destruction system is shown in FIG. 1, and is generally designated by the reference numeral 10. For purposes of convenience herein, the "digital media inventory control, distribution and destruction system" invention will be abbreviated as "MICS" (for "media inventory control system"), and various components of the invention will be identified hereinafter with "MICS" as a prefix.

The system 10 includes a digital media creator-destroyer apparatus 12 that would be housed within a retail store 14 shown in schematic cross-hatching in FIG. 1. The MICS creator-destroyer 12 is discussed in more detail below in association with FIG. 2, and in a preferred embodiment would be an integral apparatus combining all necessary components for fulfilling required functions in one machine. Alternatively, the MICS creator-destroyer may be several separate components secured in electrical communication with each other for system recognition and support so that the separate components (not shown) perform the required functions described herein. Accordingly, such alternative MICS creator-destroyer apparatus 12 will be characterized herein as a digital media creator-destroyer apparatus means for receiving and storing in a memory component digital media from a remote digital media source, for generating multiple transferable copies of the digital media, and for destroying unused copies of the digital media, including any components known in the art or subsequently developed for performing those functions. For purposes herein, the word "unused copies" when utilized in the aforesaid phrase "destroying unused copies" is to be understood to include any copies of digital media SKUs that are not sold or otherwise transferred, that are returned by end-users, that are defective, or that are not to be commercially distributed by the retail store for any reason.

A manager of the retail store or order controller 16 communicates with the MICS creator destroyer 12 through an electronic interface 18 to facilitate communication from the MICS creator-destroyer 12 through line 19 to a remote media source or sources 20 to request transfer to the MICS creator-destroyer 12 in digital format of a specific digital media, such as a soon-to-be released popular musical recording, popular movie, video game, computer software, etc. The remote source 20 then transfers through digital path 22 the requested digital media. By use of the phrases "electronic interface 18", "line 19", and "digital path 22" it is meant that the described communication or transfer can take place in any manner known or subsequently invented and capable of facilitating the described function, including hard-wires, electro-mechanical switch mechanisms, satellite communications, radio, telephone, wireless communication, computer to computer communications, etc. Use of the phrases and words such as "line", "digital path" are simply to aid in understanding the system 10 of the invention as shown in FIG. 1.

The MICS creator-destroyer 12 then communicates through line 23 with the MICS central database 24 to inform the database 24 that the requested digital media has been received and is resident within the MICS creator-destroyer 12. Upon command of the order controller 16, the MICS creator-destroyer 12 may then generate multiple copies of the digital media, such as by burning compact disk copies (not shown), which are then transferred by path 26 to a secure storage unit 28 within the retail store 14. Alternatively, the MICS creator-destroyer 12 may simply store the digital media within its memory, and communicate its resident status through line 30 to an end-user purchaser interface 32 within the retail store 14. The end-user interface 32 may be a store clerk with a cash register as is known, or a kiosk housing a computer menu-driven selection catalog and electronic payment apparatus. Upon request for a specific digital media SKU copy at the end-user interface 32, the clerk or computer of the interface 32 simply requests that the MICS creator-destroyer 12 transfer from storage 28 or generate a copy to be transferred to the interface 32 for distribution to the end-user (not shown). All such transactions would then or simultaneously be communicated through line 23 from the MICS creator-destroyer 12 to the MICS central database 24.

As shown in FIG. 1, the store manager or order controller may communicate with the MICS creator-destroyer 12 from a remote order controller 34 that is not housed within the retail store 14 through line 36. The order controllers 16, 34 are also capable of communicating through line 36 with the MICS central database 24 to be aware of sales volume, revenues, costs of acquisition of various digital media, etc. With such information, the order controllers 16, 34 may then communicate through line 37 remote digital media acquisition information to the MICS creator-destroyer 12 to acquire additional digital media or generate additional copies for storage 28, etc. By use of the remote order controller 34, the system 10 may facilitate one manager communicating with a plurality of MICS creator-destroyers 38 through line 39 in various remote locations 40 on a regional or national basis, such as for a chain of hundreds or thousands of music stores in shopping malls throughout the country. In response to the remote order controller 34 communicating such digital media acquisition information with the MICS central database 24 and the other remote MICS creator-destroyers 38, the media sources 20 may then transfer the digital media through path 42 to the remote MICS creator-destroyers 38, or communicate destruction orders to the remote MICS creator-destroyers, based upon specific regional and national digital media sales and demand factors.

The system 10 also includes remote purchase apparatus, such as a remote retail purchase apparatus 44, and a remote personal purchase apparatus 46. The remote retail purchase apparatus could be a shopping mall "kiosk" 45 type of apparatus that is either attended or unattended by personnel, including a computer menu-driven catalog of available digital media. Upon selection of a specific, available copy of a digital media, the remote retail purchase apparatus would request though line 48 to the MICS creator-destroyer 12 transmission through path 50 to the remote retail purchase apparatus 44 which would then generate or transfer a copy to the end-user, such as by burning a copy of a compact disk, or by loading the digital medial copy into the end-user's transportable memory component, such as hand-held video game, "MP3" music player, ring tones for a cellular telephone (not shown) etc.

Similarly, the remote personal purchase apparatus 46 could be any mechanism that permits communication through line 52 with the MICS creator-destroyer 12, such as a home or office personal computer 53 communicating through the world wide web, otherwise known as the "internet". Upon request and satisfaction of any payment obligations through the remote personal purchase apparatus, the MICS creator-destroyer 12 would then transfer a copy of the digital media through path 54 to the remote personal purchase apparatus 46 for storage in a memory component of the apparatus or burning of a compact disk or other portable copy of the digital media. All such transactions through the remote purchase apparatus 44, 46 would also be communicated through line 23 from the MICS creator-destroyer 12 to the MICS central database 24.

One or more monitors 56, such as owners or operators of the overall MICS system 10 would have access to all information about the system 10 on an ongoing basis through line 58 between the monitors 56 and the MICS central database.

In a preferred embodiment, the MICS system means for identifying and/or means for generating in each of the multiple copies of the digital media a specific, linked-code that is specific and unique for each particular copy of digital media. The linked-code may be specific to a particular MICS creator-destroyer 12, and may include identification of the MICS creator-destroyer that generated the linked-code copy. Alternatively, such a copy-specific linked-code could also be put into the copy that is manufactured at a traditional media manufacturing facility, wherein such a traditional media manufactured digital media copy has a MICS system 10 linked-code or compatible readable code. All MICS system 10 linked-codes or MICS system compatible readable codes within digital copies include copy-specific information that can be read by the MICS creator-destroyer means 12, 38 and that can be matched to coding for all of the linked-code copies stored within the MICS central database 24. The linked-code copies therefore provide for efficient monitoring of the status of all copies of the digital media, including destruction of certain copies, and communication of the status including any destruction of linked-code copies to the MICS central database 24. This feature dramatically enhances security of the digital copies produced and/or distributed by the system 10.

As shown schematically in FIG. 1, any returns of defective or unwanted copies of the digital media may be transferred by an end-user at the end-user interface 32 within the retail store 14 to be then transferred by path 60 to the MICS creator-destroyer 12. Alternatively, returned, unused copies may be transferred by an end-user to the remote retail purchase apparatus 44 for return by path 62. Such returned, and/or defective unused digital media copies along with any unsold copies stored in the secure storage unit 28 of the system (said copies being collectively referred to herein as "unused" copies as aforesaid) would then, upon order of the order controller 16, 34 be destroyed by the MICS creator-destroyer 12.

In a preferred embodiment, the MICS creator-destroyer may include destruction linked-code reading component means 65 (shown in FIG. 3) for first reading a digital media copy to be destroyed to verify it is a linked-code copy, prior to carrying out destruction of the copy. If creator-destroyer 12 can read a linked-code, the creator-destroyer then communicates the identity and destruction of the copy to the MICS central database 24. The MICS creator-destroyer 12 then destroys the linked-code copy of the digital media. If the destruction linked-code reading component means 65 is unable to read the linked-code of the copy, or if the copy has no linked-code, then the order controller 16, 34 may elect to destroy the copy, or instead to utilize the copy for investigation of a security breach. By directly transferring to the MICS central database 24 the identity of the destroyed copy of the digital media (not shown), the MICS system 10 is capable of immediately crediting as a return the destroyed copy and of communicating that credit from the MICS central database 24 to the MEDIA source 20 through line 59.

The linked-code may be in the form of an encrypted code that can only be read by components of the MICS system 10, or may include components of a known "digital watermark" security format, or the linked-code may be of or include components that are easy to read or scan for downstream monitoring purposes. Thus, the MICS system 10 includes components for comprehensive retailer-control of inventory generation, distribution and destruction of copies of digital media.

Figure 2:
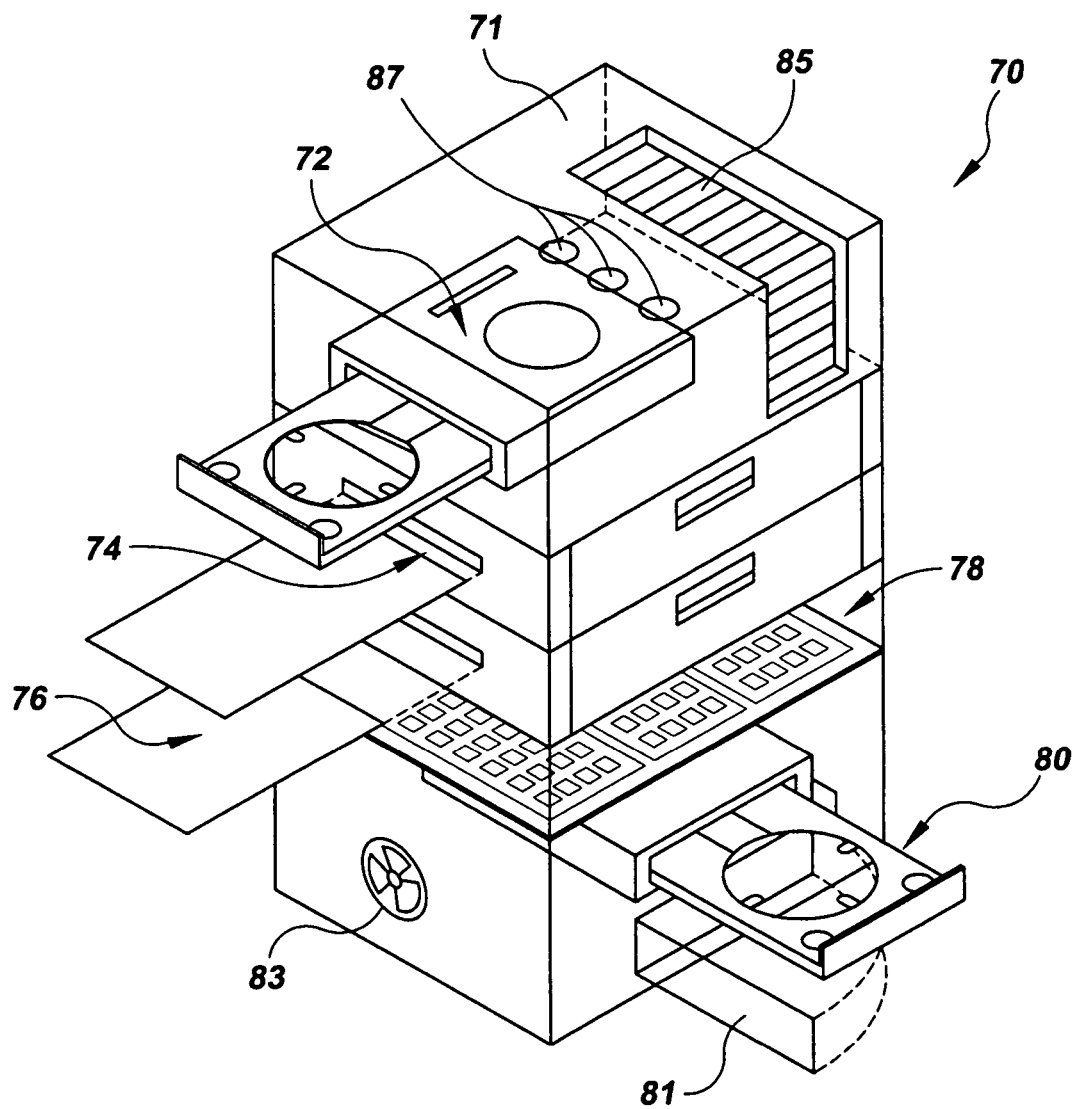
FIG. 2 is a perspective view of a digital media creator-destroyer apparatus appropriate for usage within the present invention.

FIG. 2 shows a simplified exemplary integral form of the MICS creator-destroyer means designated by reference numeral 70. The integral MICS creator-destroyer includes a housing 71 securing a burner component 72 for generating transferable copies of digital media; a first printer unit 74 for printing a first form of advertising artwork (for example a specific thickness and quality of paper and ink); a second printer unit 76 for printing a second form of advertising artwork or promotional material (such as a different thickness paper or colored ink, etc.); a central processing unit 78 with memory components, such as common to modern personal or main frame computers including ports (not shown) for receiving and transmitting the digital media, and communication signals to system 10 components as described above; and a destruction unit 80 for destroying copies of the digital media (not shown) as described above, including a destroyed digital media storage bin 81 that may pivot out for ease of removal of the destroyed digital media. The integral MICS creator-destroyer 70 may also include common components to modern electronic compartments, such as a fan 83, cooling vents 85 for permitting flow of cooling air, control switches 87, and power cords (not shown) and communication lines described with respect to FIG. 1. The components of the integral MICS creator-destroyer 70 communicate with each other and the other described MICS 10 system components in a manner known in the art, such as known in "all-in-one" computerized office printers, compact disc burners of personal computers, etc. It is stressed again, that the MICS creator-destroyer 12 may consist of components capable of performing the described functions that are not integral, but instead communicate with each other for system 10 support and recognition in a manner adequate to carry out the described functions.

Figure 3:
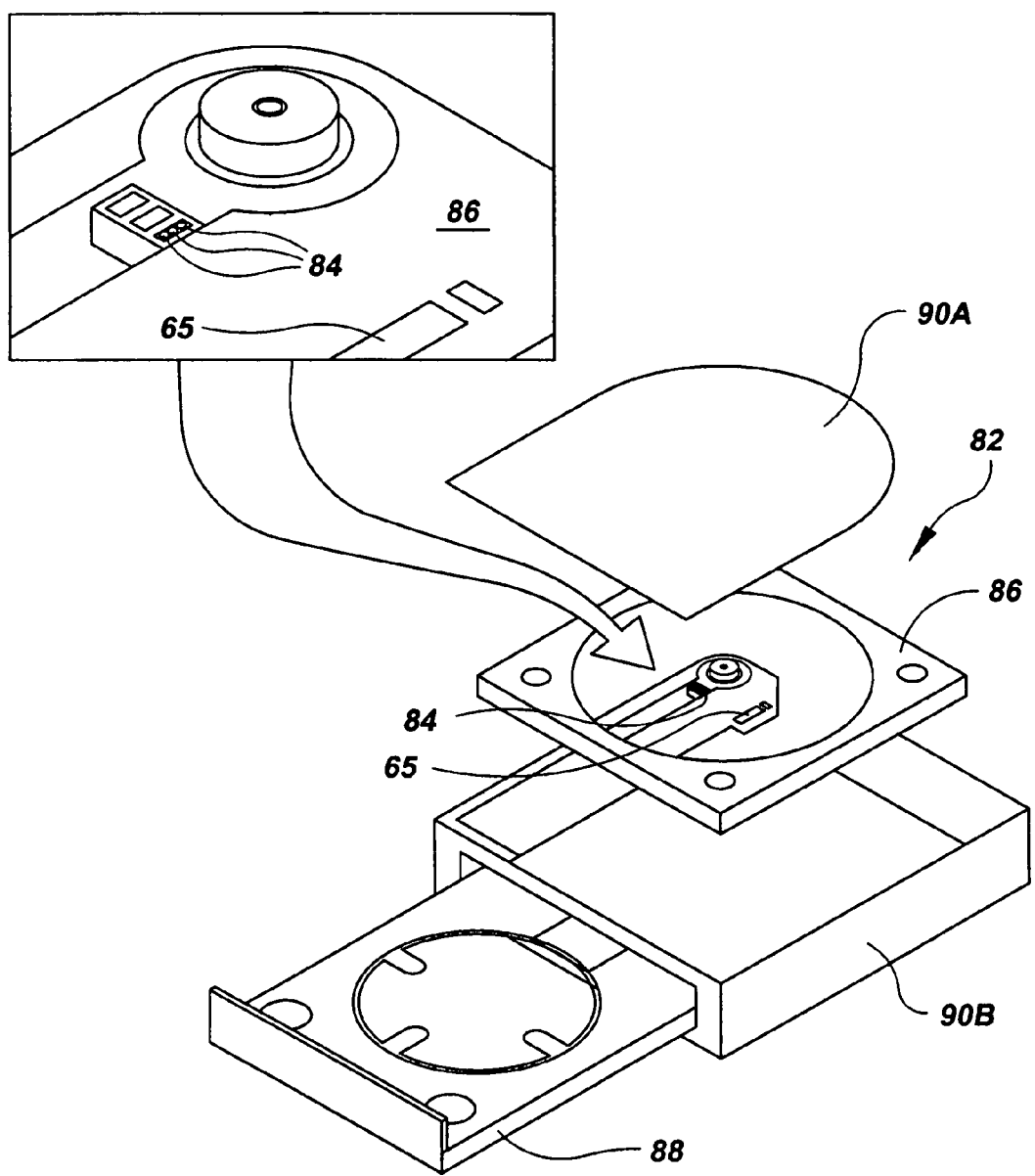
FIG. 3 is a perspective view of a digital media copy destroyer component of the FIG. 2 creator-destroyer apparatus.

FIG. 3. shows an exemplary destruction unit 82 appropriate for use within the MICS system 10 as described above. The exemplary destruction unit 82 may include a plurality of hard tips 84 (shown within the FIG. 3 expanded insert) made of diamonds or carbide-types of hard surfaces within a compact disk-type of spinning apparatus 86 so that the tips 84 may scratch compact disk or digital video disk types of digital media copies (not shown) that are being spun by the spinning apparatus. As described above, the destruction unit may also include a destruction linked-code reading component means 65. The destruction unit may also include a standard digital media copy insert slide 88 that directs the digital media copy (not shown) into the destroyer housing 90A, 90B to be secured upon the spinner 86 for destruction. Alternatively, the destruction unit 82 may include a compression component, or a perforation component (not shown) for destruction of the digital media alone or in combination with the above described hard tips.

The destruction components of the MICS creator-destroyer 12 may also include any known mechanism capable of destroying a copy of digital media, including creasing the copy; slicing the copy; tearing the copy; applying a corrosive chemical to the copy; partially or completely burning the copy or any other known or subsequently developed method that is capable of permanently destroying a copy of digital media. In the exemplary destruction unit 82, a compact disk form of a copy of digital media could be destroyed by "overspinning" the media in the destruction spinner 86 until it is erased and/or defaced; or by destroying the media in the destruction unit's drive using a laser and/or erase functionality to erase, to write or burn over and/or destroy and/or deface the digital media copy (not shown).

The MICS system 10 contemplates that packaging sleeves and/or packaging sleeves including artwork or related advertisements specific to digital copies may be delivered to the retail store 14 through conventional transport methods and stored for display with modest concern for security within the retail store 14. Such marketing sleeves that do not have the digital media copies within are not a security risk, and hence do not have to be returned to the media source if unused. Consequently, the MICS system 10 enhances security of copies of digital media by providing for storage of the valuable digital media copies in small volume MICS storage units 28 that may be housed within the retail store 14 in secure areas to which non-store personnel, potential purchasers have no access. Also, the MICS system 10 further enhances security through the linked-code aspect of the system as described above.

The MICS system 10 thus provides for revolutionizing the distribution and sale of digital media by dramatically minimizing existing costs, enhancing security, and providing for a remarkably efficient and novel system for providing digital media to consumers without disrupting established consumer purchase habits and traditions. The MICS system 10 provides for unprecedented, direct control of a retailer's inventory of digital media on a store, regional or national level through the above described generation of digital media copies by burning them at the time of purchase or shortly therebefore, and by the described automated, secure and controlled digital media destruction at a retail level thereby enhancing security while eliminating the enormous costs of return shipping, etc.

The MICS creator-destroyer unit 12 may include the described components, and in preferred embodiments may also include additional retail enhancements, such as a bar code reader-scanner, the digital media burner 72, and destroyer 80, and the printer units 74, 76 may also include the capacity to add bar code and other valuable retail information to the packaging for the digital media copies. The MICS creator-destroyer unit 12 also includes the described CPU and modern computer hard drive or memory components 78, and would also include "USB" and ethernet ports, a substantial RAM memory, routers, a plurality of interactive video monitors (not shown), modern computer security apparatus (not shown) and other computer components known in the art, along with modern network capacity capable of permitting simultaneous connection of the unit 12 with the internet and with a plurality of similar units (not shown).

The MICS system 10 allows retailers to carry unlimited amounts of SKU's, because rather than allocating shelf space for storage of SKU's, all a retailer has to do is have the desired digital media, whether music, software, video games, DVD, etc. in the MICS database for the consumer to purchase that media in minutes. The digital media stored by the system 10 may be secured by a unique visible coding on the digital media copies via printing; by a unique invisible coding on to the media; by a unique recorded coding into the media at the time of pressing/burning/writing at the retail destination; by a recorded coding onto or into the media at the time of blank media manufacturing; by utilization of specific color and/or other specific patented or non-patented characteristic media; by coding on outer and/or inner packaging. Additionally, each coded item may or may not be entered into the central database 24 of into the MICS creator-destroyer unit, which may then be used to track sales, returns/destructions, to verify authenticity and create reports. Also, the coding may be alphanumeric or audio or video or physically affixed coding or labeling or any combination thereof.

It is stressed that the copy of the digital media product to be pressed, burned, written may be created at the behest of a customer or at the request of a retail employee or agent. In particular, the retail customer can create a mix of songs from his/her mind then read them to the retail clerk who can scan the database for their availability, assemble the order and issue the burn order into the MICS system 10 and create the product within minutes. The retailer can post lists of songs that can be selected either in total or in part or in any order by the customer. Moreover, the customer can select any out of stock media catalogue item for burning/pressing/writing by MICS, as long as that item is available inside the MICS creator-destroyer 12 directly, or through the media sources 20. The customer may also be able to make these selections from a video monitor (not shown) associated with the MICS creator-destroyer unit stationed by the retailer in the retail location or in a nearby remote location 44 accessible to the customer.

Additionally, the customer may also be able to access the created digital media copy in the store or at the remote retail location 44 by having that media delivered directly to a portable entertainment device such as a portable "MP3" player, cell phone, "iPOD" brand portable music player, portable DVD player or any other portable entertainment device or storage device, such as a cellular telephone, which can be serviced or connected electronically by known technology to the MICS creator-destroyer unit 12. The customer may also be able to access MICS digital media copies purchased at a retail location through the remote personal components 46, such as multiple home computers or portable devices using password protected, user identification systems, similar to content access rules now in place for "iTunes" brand name online-centric service. The suppliers, creators, distributors, retailers users of the MICS system 10 may place restrictions & guidelines on accessing the media on other devices. It is also anticipated that digital media copies may be able to be purchased remotely online through an internet connection to the MICS creator-destroyer 12 and then accessed at a MICS retail location 14. Under this scenario consumers may select a specific retailer, or a pool of retailers could agree to grant certain access rights to all MICS users in return for distribution, profit participation or consumer convenience.

The retailer having a MICS creator-destroyer 12 of as part of the MICS system 10 may pre-burn or otherwise create copies of digital media units of new releases or catalogue (in addition to creating just in time media/burns for customer requests) in different ways. First, the Retail Store Manager or Store Agent may enter a burn, press, write i.e. "Media Creation Order" from any SKU's in the MICS creator-destroyer 12 database 78, or available thereto from the MICS media sources 20, either while in the store, or via the remote order controller 34. Additionally, a Regional or a National Retail Chain Manager may enter Media Creation Orders for specific SKU's and specific numbers of the specific SKU's for one store or for an entire region of stores 40, individually, or collectively through the remote order controller 34. Orders can be entered into the MICS system from any location using password-protected access.

Requests to destroy unused digital media copies (not shown) can also be made to stores by managers using this remote order controller process. When a burn or destroy request is directed to a store 14 the MICS system 10 will log the report and alert the local store 14 via a video monitor screen (not shown) operating system known in the art. Such requests can be saved into the MICS creator-destroyer unite 12 and printed out. Also, the control switches 87 may include or be in the form of flashing request lights on the MICS creator-destroyer 12 that may also alert store personnel to an incoming request for creation or destruction of copies of digital media. Management can gauge individual store sales activity instantly through Status Reports, which would log all creation and destruction of media units, that could be sorted by specific SKU, by store 14, by a specific vendor, region, or by an entire chain of retail stores 40.

The transfer of digital media from the media sources 20 is not limited to a static location, such as an owner of digital media (e.g., the "MICROSOFT Company"), but may also include physical media updates to the hard drive of the MICS creator-destroyer unit 12. Additionally, updates can be downloaded or physically delivered to hard drives of the units 12. Hard drives of the units can also be receive digital media either via online or via physical media update methods with specific SKU's. Also, any combination of hard drive physical update or remote update or direct transfer of digital media to the MICS creator-destroyer unit can be used to service the full realm of digital media products made available to the MICS system 10.

The MICS system 10 may also include software known in the art for providing remote access to inventory control & reports. Password protected web access to MICS system components allows system 10 users to access sales reports on a store by store (single, group or total stores), SKU by SKU, and variable time basis. Remote access for such users allows for Media Creation or destruction orders to be implemented in a single store or across a group of stores. Such software would also provide in store access for the retailer system user and may also provide for access for a consumer. Potential consumer access would allow for orders of any recorded digital media copies available via MICS database or custom orders of single songs, perhaps grouped together. Digital media copies could be located via a search function, via prominent display by MICS video monitors (not shown) as programming, via MICS recommendations either based upon prior use by consumer, by groups of consumers, via "CRM" systems, via research or via matches input by the consumer. Such consumer orders would be transmitted to a retailer store 14 and put in a "holding folder" until the customer approaches an employee sales clerk (not shown) of the store 14 to pay for the order. The order may also be transmitted to the sales clerk by the consumer with a printout generated by the consumer accessed video display printer (not shown) in the store, which can print out a custom code to cue for Media Creation, which can be handed to the clerk. The MICS system 10 may also be utilized at home by consumers, perhaps via registration & password protection, for those who want to have their media created and picked up at their local retail store 14. Billing then could take place at the retail store 14 or online.

The MICS central database 24 identifies all media forms and available SKU's. Each request made by a retail installation 14, 40 could include a specific request for a specific media SKU or SKU's by code such as the "UPC" known in the art. The request from the retail store 14, 40 could also contain a unique retail "store" code identifier and a unique product stamp. In this way, as each digital media copy that is fulfilled from the content server creates a record of which SKU to which store, at which time and which specific unique code are all burned, pressed, written and/or affixed into or onto the created digital media copy and subsequently logged into the MICS central 24 database for billing, reports and reference, etc. When a digital media copy is destroyed through the MICS creator-destroyer unit 12, that unique identifier is read by the MICS unit 12 and used to match the destruction of the digital media copy with the number at the point of the creation of the copy by the MICS system. The destruction of a returned copy or of an unused copy, once matched by the identifier, is then logged and reconciled in the MICS central database 24.

It is stressed that customers select digital media copies through the MICS system 10 within the traditional retail store environment and the customer experience can be maintained to keep the customers ingrained buying habits intact. Software distributors may ship slip covers and/or booklets of product to retail, which can then be placed in rack displays or end caps by retailers for customers to select and browse, as they usually do while shopping. MICS manufactured digital media copies may or may not be placed inside the slip covered containers by retailers. Once the MICS created digital media copy has been placed inside a packaging container for sale by the retailer during a purchase process at the checkout counter, the retailer may affix a security gold tape band, or other means of securing the package closed, to secure the media closed within its package. The at the counter method prevents theft, since media is only obtained by the customer during purchase.

Accordingly, it can be seen that the MICS system revolutionizes distribution of copies of digital media by enhancing the efficiency and flexibility of the sales experience for consumers, by radically reducing costs for the producers, distributors and retailers of digital media, and by dramatically increasing security of digital media transactions.

While the present invention has been disclosed with respect to the described and illustrated embodiments, it is to be understood that the invention is not to be limited to those embodiments. Accordingly, reference should be made primarily to the following claims rather than the foregoing description to determine the scope of the invention.

What is claimed is:

1. A local media inventory control, distribution and destruction system, comprising:
   means for receiving and storing content from a content source;
   means for uploading sales information from the local media inventory control, distribution and destruction system over a network to a remote central database, the uploaded sales information based on local customer interaction with the media inventory control, distribution and destruction system;
   means for downloading a request from the remote central database for a particular inventory level of portable copies of the stored content, the particular inventory level based at least in part on uploads from other remote media inventory control, distribution and destruction systems to the remote central database over the same or another network, wherein the particular inventory level is based at least in part on remote customer interaction with the remote media inventory control, distribution and destruction systems; and means for maintaining a local inventory level of portable copies of the stored content according to the particular inventory level, the local inventory maintained by generating new portable copies of the stored content as needed to meet the particular inventory level and by destroying existing portable copies of the stored content as needed to meet the particular inventory level;

wherein the system maintains the local inventory of the portable copies of the content based at least in part on purchasing and demand information fed back to the remote central database from the other media inventory control, distribution and destruction systems.

2. The local media inventory control, distribution and destruction system of claim 1, wherein the maintaining means further comprises a media copy burner, a media destruction unit, and a central processing unit for storing the received content, and for selectively processing the content to the media copy burner, and wherein the system is housed within a retail outlet and the content source is remote from the retail outlet.

3. The local media inventory control, distribution and destruction system of claim 2, wherein the media copy burner, the media destruction unit and the central processing unit are secured within a common chassis.

4. The local media inventory control, distribution and destruction system of claim 2, wherein the system further comprises means for securely storing the maintained inventory of the portable copies.

5. The local media inventory control, distribution and destruction system of claim 1, further comprising means for uploading, to the central database, storage information on identification of the content stored by the system, digital watermark values contained in the generated portable copies, and digital watermark values associated with the destroyed portable copies.

6. The local media inventory control, distribution and destruction system of claim 1, further comprising a destruction linked-code reading component means for reading an existing portable copy to be destroyed to verify it is a linked-code copy, prior to carrying out destruction of the existing portable copy.

7. The local media inventory control, distribution and destruction system of claim 1, further comprising a printer unit for printing copies of advertising art associated with the maintained inventory.

8. The local media inventory control, distribution and destruction system of claim 1, further comprising means for uploading to the central database digital watermark values associated with the destroyed portable copies.

9. The local media inventory control, distribution and destruction system of claim 1, further comprising means for uploading to the central database digital watermark values contained in the generated portable copies.

10. A digital media inventory control, distribution and destruction system, comprising:

digital media creator means for receiving and storing digital media from a digital media source, for generating multiple portable copies of the digital media according to an inventory level request generated by a remotely located device, the inventory level request based at least in part on sales information received by the remotely located device unit from the digital media inventory control, distribution and destruction system and other remotely located digital media inventory control, distribution and destruction systems; and digital media destroyer means for destroying selected ones of the generated multiple portable copies of the digital media according to the inventory level request.

11. The system of claim 10, wherein the digital media creator means further comprises means for identifying and means for generating a distinct, linked-code in each portable copy of the digital media generated by the digital media creator means, the linked-code identifying within each portable copy an identity of the creator means and a distinct code for each portable copy.

12. The system of claim 11, further comprising means for communicating the linked-code of a particular portable copy to the remotely located device central unit upon transfer of the particular portable copy to a purchaser.

13. The system of claim 11, further comprising means for communicating the linked-code of a particular portable copy to the remotely located device central unit upon destruction of the particular portable copy by the digital media destroyer means.

14. A media generation and destruction apparatus, comprising:

a memory to store content;

a communication interface to download inventory level information from a remote central database over a network, the inventory level information based at least in part on sales information received by the remote central database from the apparatus and other remotely located media generation and destruction apparatuses;

a burner component to generate portable copies of the content stored in the memory according to the inventory level information;

a storage area to house the generated portable copies;

a destruction component to remove selected ones of the portable copies housed in the storage area for destruction according to the inventory level information; and a computer-readable medium having instructions stored thereon that, if executed by a computing device, cause the computing device to perform operations comprising:

tracking a local inventory of the portable copies housed in the storage area;

comparing the downloaded inventory level information to the local inventory level; and controlling the burner and destruction components to add or remove the portable copies to or from the storage area according to the comparison.

15. The media generation and destruction apparatus of claim 14, further comprising:

a customer interface to indicate available titles and output a portable version of one of the available titles according to an input received over the customer interface.

16. The media generation and destruction apparatus of claim 15, wherein the output portable version is retrieved from the storage area.

17. The media generation and destruction apparatus of claim 15, wherein the output portable version is generated by the burner component in response to receipt of the input over the customer interface.

18. The media generation and destruction apparatus of claim 14, wherein the operations further comprise uploading a result of the tracking to the remote central database.

19. The media generation and destruction apparatus of claim 18, wherein the tracking result identifies distinct linked-codes of the selected ones of the portable copies that the destruction component removes from the storage area.

20. The media generation and destruction apparatus of claim 14, further comprising:
- a blank media housing to house blank media to be used by the burner component;
- a waste housing to house waste media output from the destruction component;
- a first security mechanism to control access to the storage area; and
- a second security mechanism to control access to the blank media and waste housings;
- wherein the security mechanisms operate so that access to the blank media and waste housings for replenishing and emptying media can be provided without providing access to the storage area that contains the inventory.

21. The media generation and destruction apparatus of claim 20, wherein the operations further comprise:
- analyzing a returned copy for linked-code information indicating whether the returned copy is an authorized copy; and
- if the returned copy is not authorized according to the analysis, controlling the media generation and destruction apparatus to cause the unauthorized returned copy to be retained for subsequent analysis by an investigator.

22. An article of manufacture comprising a computer-readable medium having instructions stored thereon that, if executed by a computing device, cause the computing device to perform operations comprising:
- receiving sales information from a plurality of remote media generation and destruction devices, the sales information delineating sales volume on an individual media title basis of inventory housed by the remote media generation and destruction devices; and
- transferring an inventory level request to at least one of the remote media generation and destruction devices;
- wherein said transferred inventory level request includes instructions to trigger the remote media generation and destruction device to automatically generate new media by copying stored content onto blank media and to automatically destroy existing media as needed to match the inventory housed by the remote media generation and destruction device to the transferred inventory level request.

23. The article of manufacture of claim 22, wherein the inventory level request indicates a particular inventory level for a particular one of the remote media generation and destruction devices, and wherein the particular inventory level is different than other requested inventory for other remote media generation and destruction devices.

24. The article of manufacture of claim 22, wherein the operations further comprise processing distinct linked-codes received from the plurality of remote media generation and destruction devices.

* * * * *

UNITED STATES PATENT AND TRADEMARK OFFICE
CERTIFICATE OF CORRECTION

| | |
|---|---|
| PATENT NO. | : 7,805,374 B2 |
| APPLICATION NO. | : 10/988779 |
| DATED | : September 28, 2010 |
| INVENTOR(S) | : Fein |

It is certified that error appears in the above-identified patent and that said Letters Patent is hereby corrected as shown below:

Column 13, line 66, in Claim 10, delete "device unit" and insert -- device --.

Column 14, line 15, in Claim 12, delete "device central unit upon" and insert -- device upon --.

Column 14, line 19, in Claim 13, delete "device central unit upon" and insert -- device upon --.

Column 14, line 45, in Claim 14, delete "the local inventory level" and insert -- a local inventory level --.

Column 15, line 14, in Claim 20, delete "the inventory." and insert -- the local inventory. --.

Signed and Sealed this
Fifteenth Day of May, 2012

David J. Kappos
*Director of the United States Patent and Trademark Office*